(12) United States Patent
Halbach et al.

(10) Patent No.: US 6,454,463 B1
(45) Date of Patent: Sep. 24, 2002

(54) PLUG CONNECTOR

(75) Inventors: Paul Gerhard Halbach, Wuppertal;
Martin Herlitz, Remscheid; Peter Schekalla; Kamil Uc, both of Wuppertal, all of (DE)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 09/702,286

(22) Filed: Oct. 30, 2000

(30) Foreign Application Priority Data

Nov. 17, 1999 (DE) .......................... 199 55 316

(51) Int. Cl.[7] ................................. G02B 6/38
(52) U.S. Cl. ......................... 385/60; 439/352
(58) Field of Search ............... 385/56, 60, 78, 385/88, 92; 439/352

(56) References Cited

U.S. PATENT DOCUMENTS

| | | | |
|---|---|---|---|
| 3,684,321 A | * 8/1972 | Hundhausen et al. | 285/316 |
| 3,953,098 A | * 4/1976 | Avery et al. | 439/258 |
| 4,017,139 A | * 4/1977 | Nelson | 439/352 |
| 4,479,696 A | 10/1984 | Lubin et al. | |
| 4,684,210 A | 8/1987 | Matsunaga et al. | |
| 4,762,389 A | 8/1988 | Kaihara | |
| 5,764,834 A | * 6/1998 | Hultermans | 385/60 |
| 5,960,138 A | * 9/1999 | Shimoji et al. | 385/58 |
| 5,997,333 A | * 12/1999 | Konda et al. | 439/352 |
| 6,152,608 A | * 11/2000 | Ghara et al. | 385/60 |

FOREIGN PATENT DOCUMENTS

DE 42 39 124 A 1 11/1992

* cited by examiner

Primary Examiner—Khiem Nguyen
Assistant Examiner—Thanh-Tam Le
(74) Attorney, Agent, or Firm—Thomas N. Twomey

(57) ABSTRACT

A plug connector (10) for light conductors comprises two connector parts (12, 14) which can be plugged together and locked to one another and of which at least one (12) is provided with at least one optical ferrule (16). The ferrule (16) which is associated with a first connector part (12) can be locked via a locking device (18) with the other connector part (14). The first connector part (12) comprises a base part (20) which accommodates the ferrule (16), a housing (22) which is movable in the plugging or axial direction (5) over a definite range relative to the base part (20) and a secondary locking element (24) which is movable in the plugging or axial direction (S) in each case over a definite range both relative to the base part (20) and relative to the housing (22), said secondary locking element (24) being resiliently supported at the base part (20) and being urged by the spring force into a forward securing position when viewed in the plugging direction (S) in which it secures the locking of the ferrule (16) when the connector parts (12, 14) are plugged together. The secondary locking element (24) can be first moved out of its securing position against the spring force during the plugging together of the two connector parts (12, 14) in order to enable a locking of the ferrule (16). It assumes its securing position again only after the completion of the locking. The secondary locking element (24) is movable out of its securing position during the separation of the two connector parts (12, 14) with a drawing back of the housing (22) relative to the base part (20) against the spring force in order to enable an unlocking of the ferrule (16).

10 Claims, 3 Drawing Sheets

PLUG CONNECTOR

TECHNICAL FIELD

The invention relates to a plug connector for light conductors, comprising two connector parts which can be plugged together and locked to one another and of which at least one is provided with at least one optical ferrule, i.e. at least one optical terminal.

BACKGROUND OF THE INVENTION

The object of the invention is to create a plug connector of the initially named kind which can be handled as simply as possible with high reliability.

SUMMARY OF THE INVENTION

This object is satisfied in accordance with the invention in that a locking device is provided, via which the ferrule which is associated with a first connector part can be locked with the other connector part; in that the first connector part comprises a base part which accommodates the ferrule, a housing which is movable in the plugging or axial direction over a definite range relative to the base part and a secondary locking element which is movable in the plugging or axial direction in each case over a definite range both relative to the base part and relative to the housing, said secondary locking element being resiliently supported at the base part and being urged by the spring force into a forward securing position when viewed in the plugging direction in which it secures the locking of the ferrule when the connector parts are plugged together, with the secondary locking element first being moved out of its securing position against the spring force during the plugging together of the two connector parts in order to enable a locking of the ferrule, and assuming its securing position again only after the completion of the locking, and with the secondary locking element being movable out of its securing position during the separation of the two connector parts with a drawing back of the housing relative to the base part against the spring force in order to enable an unlocking of the ferrule.

As a result of this construction there results with respect to the locking a kind of good and bad function, through which a high reliability is achieved. The plug connector is moreover extremely simple to handle. Thus for a plugging together and separation of the two connector parts the connector housing need merely be accordingly pushed in or drawn out respectively.

The housing can be coupled preferably via flexible latching elements to the base part in such a manner that the base part can be moved together with the housing during the plugging together of the two connector parts and can, during the separation of the two connector parts, first be moved back relative to the base part over a definite range while taking along the secondary locking element.

The secondary locking element is expediently urged into its securing position by a compression spring which is supported at the base part.

It is also advantageous when the secondary locking element is formed by a preferably ring-shaped slider element.

In an expedient practical embodiment of the plug connector in accordance with the invention the locking device comprises at least one resilient locking arm which is associated with the other connector part and which in the course of a relative displacement between the ferrule and the other connector part is first deflectable against the spring force by the ferrule and can then be brought into engagement with a locking surface which is provided at the ferrule. Advantageously at least two mutually oppositely lying locking arms are provided.

The locking surface is preferably formed by a groove which is provided at the ferrule. This groove can in particular be a peripheral groove.

A preferred practical embodiment is distinguished in that during the plugging together of the two connector parts the secondary locking element first comes to an abutment at the deflected locking arm and can thereby be moved out of its securing position and then, after a latching in of the locking arm into the locking surface, assumes its securing position again as a result of the spring force in order to hold the locking arm in engagement with the locking surface.

It is also advantageous when the secondary locking element is formed in the shape of a ring and can be pushed at least partly over the locking arm after the latching in of the locking arm into the locking surface as a result of the spring force.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
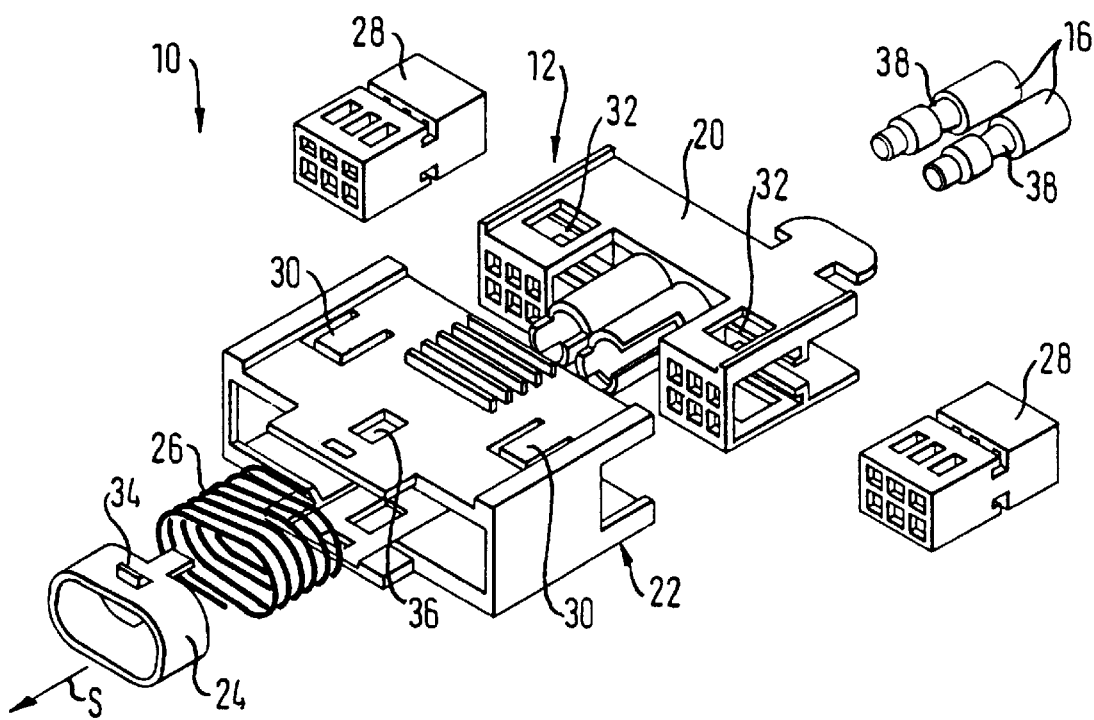
FIG. 1 is a perspective pulled apart illustration of a plug connector for light conductors comprising two connector parts.

FIGS. 1 to 7 show in schematic illustration a light-conductor plug connector 10 with two connector parts 12, 14 which can be plugged together, which can be locked with one another and of which the first is provided with two optical, clamp-like ferrules 16. The ferrules 16 which are associated with the first connector part 12, and which are connectable to corresponding light conductors, can be locked with the other connector part 14 via a locking device 18.

The first connector part 12 comprises a base part 20 which accommodates the ferrules 16, a housing 22 which is movable in the plugging or axial direction S over a definite range relative to the base part 20 and a secondary locking element 24 which is movable in the plugging or axial direction S in each case over a definite range both relative to the base part 20 and relative to the housing 22.

The secondary locking element 24 is supported via a compression spring 26 at the base part 20 and is urged through the spring force into a front securing position when viewed in the plugging direction S in which it secures the locking of the ferrules when the connector parts 12, 14 are plugged together.

In this the secondary locking element 24 is first movable out of its securing position against the spring force when the two connector parts 12, 14 are being plugged together in order to enable a locking of the ferrules 16. It assumes its securing position only after the completion of the locking.

The secondary locking element 24 is movable out of its securing position during the separation of the two connector parts 12, 14 with a drawing back of the housing 22 relative to the base part against the force of the compression spring 26 in order to enable an unlocking of the ferrules 16.

In accordance with FIG. 1 the first connector part 12 moreover comprises two modular 6-way connector elements 28, which in the present exemplary embodiment can be inserted into the base part 20 from two mutually oppositely lying sides.

The housing 22 can be coupled via flexible latching elements 30 to the base part 20 in such a manner that the base part 20 can be moved together with the housing 22 during the plugging together of the two connector parts 12, 14 and, during the separation of the two connector parts 12, 14, can first be moved back relative to the base part 20 over a definite range while taking along the secondary locking element 24. In the present exemplary embodiment the flexible latching elements 30 cooperate with cut-outs 32 which are provided in the base part 20.

As can be recognized in particular with reference to FIG. 1, the secondary locking element 24 can be formed in particular by a ring-shaped slider element.

Plastic fingers or the like, via which the secondary locking element 24 is taken along during the separation of the connector parts 12, 14 with a drawing back of the housing 22, can be provided at the housing 22. In this, this secondary locking element 24 can be taken along over a range of for example approximately 3.5 mm before the base part 20 is moved back. The locking of the ferrules 16 is thereby released.

As can be recognized with reference to FIGS. 2 to 7, a corresponding tab 34 which engages into a cut-out 36 which is provided at the housing 22 can be provided at the secondary locking element 24.

The locking device 18 comprises mutually oppositely lying, resilient locking arms 18', 18" which are associated with the other connector part 14 and which can first be deflected by the ferrules 16 in the course of a relative displacement between the ferrules 16 and the other connector part 14 against the spring force and can then be brought into engagement with locking surfaces 38 which are provided at the ferrules 16. In this for example two mutually oppositely lying locking arms 18', 18" can cooperate with a respective ferrule 16. In principle it is also conceivable that a respective locking arm cooperates with both ferrules 16.

In the present case the locking surfaces are in each case formed by a groove which is provided at the relevant ferrule 16, in particular a peripheral groove 38.

The secondary locking element 24 first comes into abutment at the spread apart locking arms 18', 18" during the plugging together of the two connector parts 12, 14, through which it is moved out of its securing position. After a latching in of the locking arms 18', 18" into the locking surfaces 38, the secondary locking element 24 assumes its securing position again as a result of the force of the compression spring 26 in order to hold the locking arms 18', 18" in engagement with the locking surface 38. In this the ring-shaped secondary locking element 24 can be at least partly pushed over the locking arms 18', 18" after the latching in of the locking arms 18', 18" into the locking surfaces 38.

The secondary locking element 24 can be pushed back during the plugging together of the two connector parts 12, 14 for example by an amount of approximately 3 mm before the locking arms 18', 18" latch in into the locking surfaces 38.

For example at least one electro-optical module can be associated with the other connector part 14. An electro-optical module is to be understood to mean a module of any desired design in which optical signals are converted into electrical signals and electrical signals are converted into optical signals.

Figure 2:
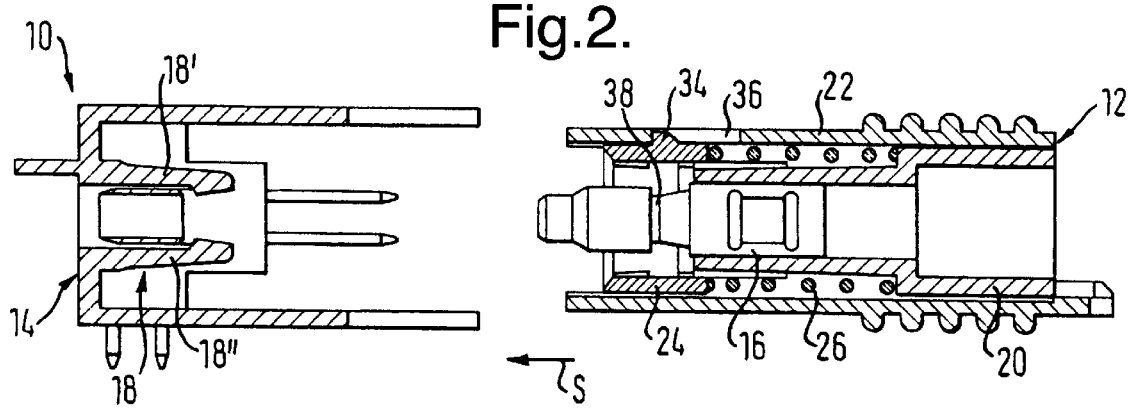
FIG. 2 is a schematic, partly sectioned side view of the plug connector prior to the plugging together of the two connector parts.

FIG. 2 shows the plug connector 10 prior to the plugging together of the two connector parts 12, 14.

Figure 3:
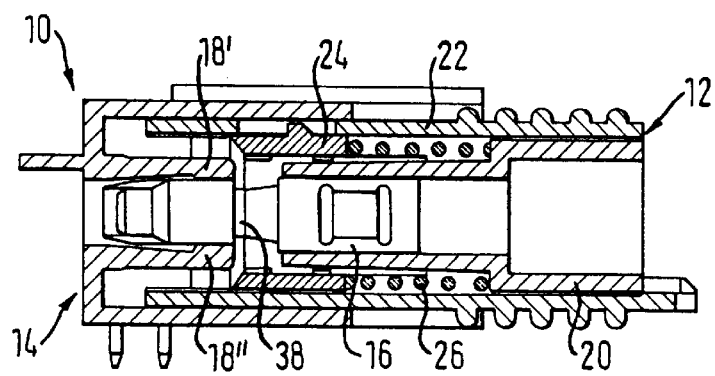
FIG. 3 is a schematic, partly sectioned side view of the plug connector, with the two connector parts already being plugged together to such an extent that the locking arms are spread apart and the secondary locking element has been moved out of its securing position against the spring force.

In the illustration in accordance with FIG. 3 the two connector parts 12, 14 are already plugged together to such an extent that the locking arms 18', 18" are spread apart and the secondary locking element 24 is moved back out of its securing position against the force of the compression spring 26.

Figure 4:
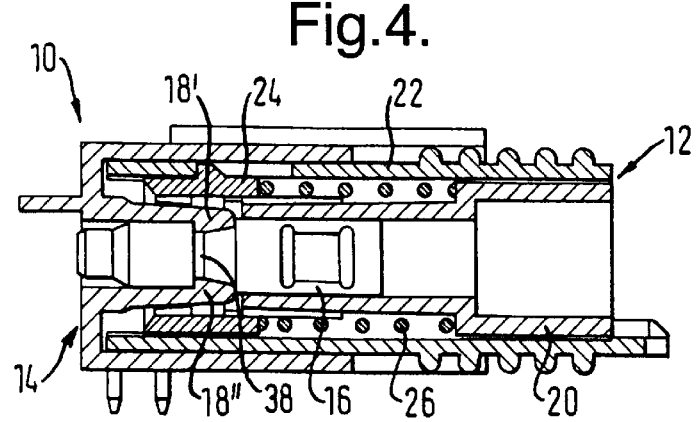
FIG. 4 is a schematic, partly sectioned side view of the plug connector, with the two connector parts being completely plugged together and the ferrules being locked with the other connector part.

In the illustration in accordance with FIG. 4 the two connector parts 12, 14 are completely plugged together and the ferrules 16 are locked with the other connector part 12.

Figure 5:
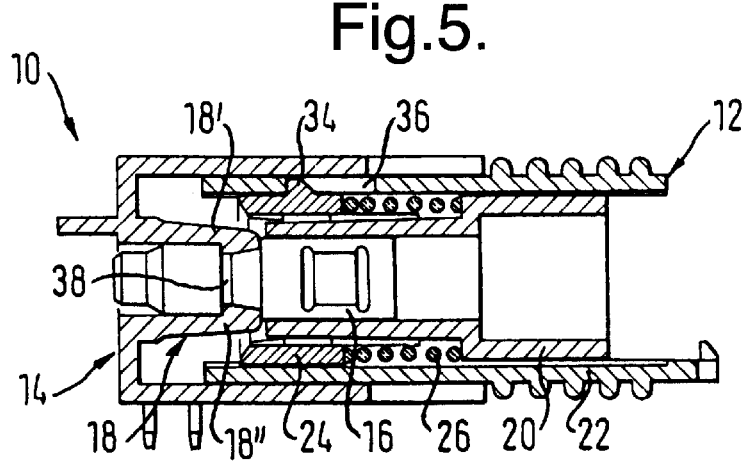
FIG. 5 is a schematic, partly sectioned side view of the plug connector, with the housing of the first connector part already being drawn out to such an extent for separating the plug connector that the secondary locking element releases the locking arms.
Figure 6:
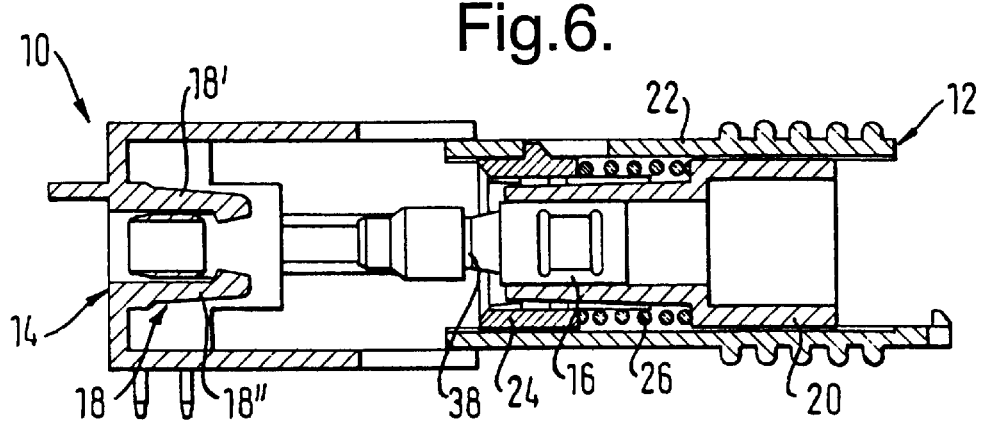
FIG. 6 is a schematic, partly sectioned side view of the plug connector, with the two connector parts already being drawn apart to such an extent that the locking arms are out of engagement with the ferrules.
Figure 7:
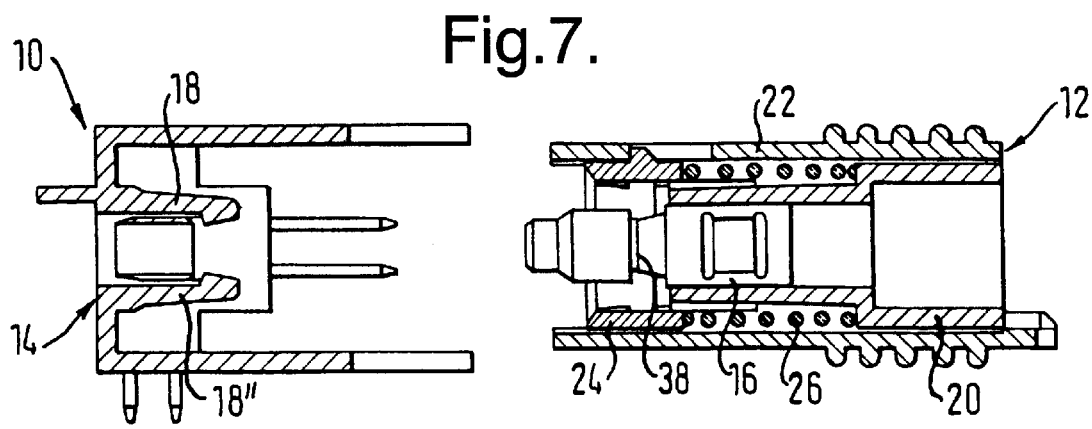
FIG. 7 is a schematic, partly sectioned side view of the plug connector, with the two connector parts being completely separated from one another again.

In FIGS. 5 to 7 it is shown how the two connector parts 12, 14 are separated from one another again.

In the illustration in accordance with FIG. 5 the housing 22 of the first connector part 12 is already drawn out to such an extent that the secondary locking element 24 releases the locking arms 18', 18".

In accordance with FIG. 6 the two connector parts 12, 14 are already drawn apart to such an extent that the locking arms 18', 18" are out of engagement with the ferrules 16.

In the illustration in accordance with FIG. 7 the two connector parts 12, 14 are again completely separated from one another.

What is claimed is:

1. Plug connector (10) for light conductors, comprising two connector parts (12, 14) which can be plugged together and locked to one another and of which at least one connector part (12) is provided with at least one optical ferrule (16), wherein a locking device (18) is provided, via which the ferrule (16) which is associated with a first connector part (12) can be locked with the other connector part (14); in that the first connector part (12) comprises a base part (20) which accommodates the ferrule (16), a housing (22) which is movable in the plugging or axial direction (S) over a definite range relative to the base part (20) and a locking element (24) which is movable in the plugging or axial direction (S) in each case over a definite range both relative to the base part (20) and relative to the housing (22) said locking element (24) being resiliently supported at the base part (20) and being urged by a spring force into a forward securing position when viewed in the plugging direction (S) in which it secures the locking of the ferrule (16) when the connector parts (12, 14) are plugged together, with the locking element (24) first being moved out of its securing position against the spring force during the plugging together of the two connector parts (12, 14) in order to enable a locking of the ferrule (16), and assuming its securing position again only after the completion of the locking, and with the locking element (24) being movable out of its securing position during the separation of the two connector parts (12, 14) with a drawing back of the housing (22) relative to the base part (20) against the spring force in order to enable an unlocking of the ferrule (16).

2. Plug connector in accordance with claim 1, wherein the housing (22) is coupled preferably via flexible latching elements (30) to the base part (20) in such a manner that the base part (20) can be moved together with the housing (22) during the plugging together of the two connector parts (12, 14) and, during the separation of the two connector parts (12, 14), can first be moved back relative to the base part (20) over a definite range while taking along the locking element (24).

3. Plug connector in accordance with claim 1, wherein the locking element (24) is urged into its securing position through a compression spring (26) which is supported at the base part.

4. Plug connector in accordance with claim 1, wherein the locking element (24) is formed by a preferably ring-shaped slider element.

5. Plug connector in accordance with claim 1, wherein the locking device (18) comprises at least one resilient locking arm (18', 18") which is associated with the other connector part (14) and which in the course of a relative displacement between the ferrule (16) and the other connector part (14) is first deflectable against the spring force by the ferrule (16) and can then be brought into engagement with a locking surface (38) which is provided at the ferrule (16).

6. Plug connector in accordance with claim 5, wherein at least two mutually oppositely lying locking arms (18', 18") are provided.

7. Plug connector in accordance with claim 5 or claim 6, wherein the locking surface is formed by a groove (38) which is provided at the ferrule (16).

8. Plug connector in accordance with claim 7, wherein the groove is formed by a peripheral groove (38).

9. Plug connector in accordance with claim 1, wherein during the plugging together of the two connector parts (12, 14) the locking element (24) first comes to an abutmenet at the deflected locking arm (18', 18") and can thereby be moved out of its securing position, and then assumes its securing position again after a latching in of the locking arm (18', 18") into the locking surface (38) as a result of the spring force in order to hold the locking arm (18', 18") in engagement with the locking surface (38).

10. Plug connector in accordance with claim 1, wherein the locking element (24) is executed in ring shape and can be at least partly pushed over the locking arm after a latching in of the locking arm (18', 18") into the locking surface (38) as a result of the spring force.

* * * * *